(12) United States Patent
Meyer et al.

(10) Patent No.: US 11,340,158 B2
(45) Date of Patent: May 24, 2022

(54) SYSTEM FOR DETECTING NON-METALLIC, NON-AQUEOUS SUBSTANCES IN AN AQUEOUS SAMPLE, A CORRESPONDING UNIT AND A CORRESPONDING METHOD

(71) Applicant: Fraunhofer-Gesellschaft zur Förderung der angewandten Forschung e.V., Munich (DE)

(72) Inventors: Johannes Meyer, Karlsruhe (DE); Robin Gruna, Baden-Baden (DE); Dirk Nüssler, Vettelschoß (DE); Thomas Längle, Eggenstein (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 82 days.

(21) Appl. No.: 16/604,627

(22) PCT Filed: Apr. 12, 2018

(86) PCT No.: PCT/EP2018/059418
§ 371 (c)(1),
(2) Date: Oct. 11, 2019

(87) PCT Pub. No.: WO2018/189309
PCT Pub. Date: Oct. 18, 2018

(65) Prior Publication Data
US 2020/0096442 A1    Mar. 26, 2020

(30) Foreign Application Priority Data

Apr. 12, 2017 (DE) .................... 10 2017 206 332.7

(51) Int. Cl.
*G01N 21/94* (2006.01)
*G01N 21/3581* (2014.01)
(Continued)

(52) U.S. Cl.
CPC ......... *G01N 21/3581* (2013.01); *G01N 21/94* (2013.01); *G01N 2021/1761* (2013.01);
(Continued)

(58) Field of Classification Search
CPC ............... G01N 21/3581; G01N 21/94; G01N 2021/1761; G01N 2021/1765; G01N 2021/8411; G01N 2021/845
See application file for complete search history.

(56) References Cited

U.S. PATENT DOCUMENTS

| 8,716,666 B1 | 5/2014 | Demers et al. |
| 2004/0016744 A1 | 1/2004 | Ottaway |

(Continued)

FOREIGN PATENT DOCUMENTS

| CN | 104181122 A | 12/2014 |
| DE | 10 2014 111 019 A1 | 1/2016 |

(Continued)

OTHER PUBLICATIONS

International Search Report, issued in International Application No. PCT/EP2018/059418, dated Jun. 27, 2018, pp. 1-3, European Patent Office, Rijswijk, Netherlands.
(Continued)

*Primary Examiner* — Mark R Gaworecki
(74) *Attorney, Agent, or Firm* — Crowell & Moring LLP (57) ABSTRACT

A system is provided for detecting non-metallic, non-aqueous substances in an aqueous sample, comprising a transmitter section, which emits electromagnetic radiation in the terahertz range towards the sample, a receiver section, which detects radiation components of said electromagnetic radia-
(Continued)

tion which are modified by the sample and/or the substances therein and an evaluation section, which evaluates radiation components which are detected by the receiver section in order to establish whether non-metallic, non-aqueous substances are present or not in the aqueous sample, a transition of the aqueous sample from the liquid aggregate state into the solid aggregate state or vice versa taking place, radiation components which are modified respectively, for a plurality of different states of the aqueous sample, during this transition being detected by means of the receiver section, and the radiation components thus detected being evaluated by means of the evaluation section.

13 Claims, 6 Drawing Sheets

(51) Int. Cl.
G01N 21/17 (2006.01)
G01N 21/84 (2006.01)
(52) U.S. Cl.
CPC .............. G01N 2021/1765 (2013.01); G01N 2021/845 (2013.01); G01N 2021/8411 (2013.01)

(56) References Cited

U.S. PATENT DOCUMENTS

2004/0228371 A1* 11/2004 Kolodzey ............. H01S 5/3402 372/5
2005/0270220 A1 12/2005 Baharav et al.

FOREIGN PATENT DOCUMENTS

| EP | 3 101 420 A1 | 12/2016 |
| JP | 2006-84423 A | 3/2006 |
| JP | 2006084423 A * | 3/2006 |
| JP | 2012-21880 A | 2/2012 |

OTHER PUBLICATIONS

U.R. Pfeiffer, "Silicon CMOS/SiGe Transceiver Circuits for THz Applications," 2012 IEEE 12th Topical Meeting on Silicon Monolithic Integrated Circuits in RF Systems, dated Jan. 16, 2012, pp. 159-162, published by IEEE, Santa Clara, CA.
Jianyuan Qin et al., "The Detection of Agricultural Products and Food Using Terahertz Spectroscopy: A Review," Applied Spectroscopy Reviews, dated Mar. 13, 2013, pp. 439-457, vol. 48, Issue 6, published online by Taylor & Francis at URL https://doi.org/10.1080/05704928.2012.745418.
Christian Jördens et al., "Detection of foreign bodies in chocolate with pulsed terahertz spectroscopy," Optical Engineering, dated Mar. 20, 2008, pp. 037003-1-037003-5, vol. 47, Issue 3, published online by SPIE.
Robert M. Haralick et al., "Textural Features for Image Classification," IEEE Transaction on Systems, Man and Cybernetics, dated Nov. 1973, pp. 610-621, vol. SMC-3, No. 6, published by IEEE, Piscataway, New Jersey.
Mäenpää Topi et al., "Texture Classification by Multi-Predicate Local Binary Pattern Operators," Proc. 15th International Conference on Pattern Recognition, dated Sep. 3, 2000, pp. 939-942, Barcelona, Spain.
Yuri Boykov et al., "Graph Cuts and Efficient N-D Image Segmentation," International Journal of Computer Vision, dated 2006, pp. 109-131, vol. 70, No. 2, published by Springer Science + Business Media, LLC, The Netherlands.
Fernand Meyer, "Topographic distance and watershed lines," Signal Processing, dated Jul. 1994, pp. 113-125, vol. 38, Issue 1, published online by Elsevier at URL https://doi.org/10.1016/0165-1684(94)90060-4.
David Mumford et al., "Optimal Approximations by Piecewise Smooth Functions and Associated Variational Problems," Communications on Pure and Applied Mathmatics, vol. 42, Issue 5, dated Jul. 1989, pp. 577-685, published online by Harvard Library at URL http://nrs.harvard.edu/um-3:HUL.InstRepos:3637121.
Nobuyuki Otsu, "A Threshold Selection Method from Gray-Level Histograms," IEEE Transactions on Systems, Man, and Cybernetics, dated Jan. 1979, pp. 62-66, vol. SMC-9, No. 1, published by IEEE, Piscataway, New Jersey.
Navneet Dalal et. al., "Histograms of Oriented Gradients for Human Detection," dated Jul. 2005, pp. 1-8, *IEEE Computer Society Conference on Computer Vision and Pattern Recognition, (CVPR'05)*, vol. 1, doi: 10.1109/CVPR.2005.177, Montbonnot, France, available at http://lear.inrialpes.fr.
Kenneth Laws, "Rapid Texture Identification, Image Processing for Missile Guidance", Dec. 23, 1980, pp. 1-6, SPIE, San Diego, United States of America.
Majid Mirmehdi, et al., "Handbook of Texture Analysis," Copyright 2008, pp. 1-424, Imperial College Press, Convent Garden, London.
Stephan Bischoff et al., "Parameterization-free active contour models with topology control", Mar. 10, 2004, pp. 1-12, The Visual Computer, Aachen, Germany.
L. Blanc-Feraud, et al., "Nonlinear image processing: modeling and fast algorithm for regularization with edge detection," Oct. 1995, pp. 1-4, *Proceedings., International Conference on Image Processing*, vol. 1, doi: 10.1109/ICIP.1995.529749.
Bing Li et al., "Action Contour External Force Using Vector Field Convolution for Image Segmentation," Aug. 2007, pp. 1-11, IEEE Transactions on Image Processing, vol. 16 No. 8.
Alper Yilmaz, et al., "Object Tracking: A Survey," Dec. 2006, pp. 1-45, ACM Computing Surveys, ACM Computing Surveys, vol. 38, No. 4, Article 13.
Werner Bäni, "Wavelets, An Introduction For Engineers," 2005, pp. 1-39, publisher, Oldenbourg, Munich.
Peter J. Burt et al., "The Laplacian Pyramid as a Compact Image Code," Apr. 1983, pp. 1-9, IEEE Transactions On Communications, vol. COM-3I, No. 4.
Peter J. Burt, et al., "Segmentation and Estimation of Image Region Properties Through Cooperative Hierarchical Computation," Dec. 1981, pp. 1-8, IEEE Transactions On Systems, Man, And Cybernetics, vol. SMC-11, No. 12.
Christopher M. Bishop, "Pattern Recognition and Machine Learning," Copyright 2006, pp. 1-749, Springer Science+Business Media, Library of Congress.
Richard O. Duda et al., "Pattern Classification," 2001, pp. 1-738, Wiley Interscience, 2nd edition.
Ludwig Abele. "Statistical and structural texture analysis with applications in image segmentation," 1982, pp. 1-69, Dissertation, Technical University Munich.

* cited by examiner

SYSTEM FOR DETECTING NON-METALLIC, NON-AQUEOUS SUBSTANCES IN AN AQUEOUS SAMPLE, A CORRESPONDING UNIT AND A CORRESPONDING METHOD

CROSS-REFERENCE TO RELATED APPLICATIONS

This application is a 371 nationalization of international patent application PCT/EP2018/059418 filed Apr. 12, 2018, which claims priority under 35 USC § 119 to German patent application 102017206332.7 filed Apr. 12, 2017. The entire contents of each of the above-identified applications are hereby incorporated by reference.

DETAILED DESCRIPTION

The present invention relates to a system for detecting non-metallic, non-aqueous substances in an aqueous sample, a unit for processing aqueous samples, in particular for the production, assembly and/or packaging of foods as such samples, and to a method for detecting non-metallic, non-aqueous substances in an aqueous sample by means of such a system or such a unit.

In many areas of the food industry, it is necessary for quality assurance to test the produced products for impurities before sale. In order to ensure high reliability of the quality testing, the testing must be effected automatically. Impurities from a diameter of 1 mm must be able to be detected. The costs of the testing system must not exceed a specific scope in order to make the technology accessible even for fairly small enterprises. In order that impurity-free products can also be sold after the testing, the testing must be non-destructive and must itself also not lead to any impurities. There should thereby be understood by "non-destructive" that the product must neither be fragmented or possibly removed from its packaging, nor that any organisms possibly belonging to the product (e.g. bacteria in milk products) are destroyed. In particular, non-metallic impurities (e.g. plastic materials) thereby represent a great challenge.

Imaging high-frequency methods fulfil the mentioned requirements. However these methods have a crucial disadvantage: the radiation used is absorbed very greatly by water molecules. For this reason, the high-frequency technology cannot per se be used for testing aqueous foods.

Furthermore, X-ray systems are known from prior art. These measure the amplitude of the X-rays after radiography of the foods and compare them with a previously established threshold value. If the absorption values of ingredients and impurities are situated too closely together, simple X-ray systems can barely detect the impurities. Medical systems which are based on dual X-ray absorptiometry take two inspection images at different X-ray energies. As a result, bones, fat components and other soft masses can be differentiated. Testing devices of this type are however not suitable for inline applications (i.e. for real time applications, e.g. in manufacturing lines) because of their time requirement and cost expenditure. In addition, considerable complexity exists in the safety measures which are required because of the X-ray radiation which is dangerous for humans. Microbiological organisms can be destroyed by X-ray radiation. Since precisely bacteria are however an important component of many foods (e.g. in yoghurt), methods based on X-rays are not applicable here.

THz systems, which operate on the basis of lasers, offer an alternative to X-ray systems and allow spectroscopic analyses of contents. However, the output energy of corresponding laboratory systems is too low to achieve sufficient penetration depth and their scanning rates and costs and also the lack of commercially producible line cameras currently allow only point measurements with low to average update rates. Systems of this type are likewise not suitable for inline applications.

Imaging microwave- and millimetre-wave systems are a relatively new technology. Currently, only a few such systems are on the market. There belongs thereto the millimetre-wave- and THz system developed originally by Synview which is marketed today by Becker Photonics (cf. www.synview.com). In the following, some patent applications or patents relating to systems for testing foods by means of millimetre-wave radiation are listed: U.S. Pat. No. 8,716,666 B1, JP2012 021880 A and CN 104 181 122 A.

It is the object of the present invention to make possible economic testing of aqueous foods which solves the described problems as completely as possible.

This object is achieved by a system, by a unit, and by a method.

The active voice (e.g. "is" or "are") implies for all patent claims that the system, parts or components of the same is/are fitted, configured and/or positioned such that the described activity can be implemented. This practicability can be achieved by suitable hardware and/or suitable software (e.g. computer programs stored in (a) program memory(ies) of the system). The system can comprise therefore suitable computer-supported (e.g. PC— or microcontroller-based) control devices or even regulating devices.

The aqueous sample(s) can be e.g. foods, in particular deep-frozen goods. The non-aqueous substances can be foreign bodies, impurities and the like. In particular, such substances can be solid bodies of any type (e.g. plastic material bodies) and/or solid bodies with diameters of approx. 1 mm and larger (the last mentioned minimum size being able to be dependent upon the wavelength of the THz radiation and upon the apparatus construction of the transmitter- and receiver section). The sample(s) and the non-aqueous substance(s) are not part of the system to be placed under protection but rather objects external to the system.

According to the invention, the THz range or the THz range radiation is in the range between 10 GHz and 50 THz, preferably in the range between 50 GHz and 10 GHz, particularly preferably in the range between 100 GHz and 3 THz (respectively including the threshold values). Therefore this generally concerns electromagnetic radiation with wavelengths in the sub-millimetre range.

The term section should not be understood physically but rather functionally (applies also for the convertor section, see subsequently): thus the evaluation section can be part of the receiver section or the evaluation section can be present physically separated from the receiver section (e.g. the receiver section can be a detector and the evaluation section can be a server, computer, PC, . . . connected thereto). Likewise, the receiver section can have a plurality of individual receivers which are positioned separately from each other spatially. Likewise, the transmitter section can have a plurality of individual transmitters which are positioned separately from each other spatially. For example, in the case of inline operation in a production unit or line, at various successive stations and/or positions in the unit or line, e.g. before freezing, during freezing and after freezing, respectively a transmitter-receiver combination can be present for recording an image. The receivers can then be connected respectively to a (common) evaluation section (e.g. PC). In particular, the evaluation can be effected with microprocessor assistance, therefore the system can operate on the basis of a microcontroller or assisted by a computer.

The transmitter section can comprise, in addition to the actual emitter, also radiation shaping elements or the like which can possibly influence (shape) the radiation emitted by the emitter and/or direct it (e.g. focused) onto the (aqueous) sample. All these system components can be included within the term transmitter section. The same applies for the receiver section: radiation emitted again from the sample (in particular: transmitted through the sample, but also reflected on the sample) can, for example, be deflected, bundled etc. before the actual image recording takes place (see below).

The receiver section can receive radiation components (subsequently also abbreviated as TS or provided with the reference TS) which are modified (in particular: modified by transmission) by the sample and/or the substance(s). Basically, it is however also possible to position the transmitter section and the receiver section in the reflection arrangement.

The modified radiation components TS can be defined as follows: the radiation radiated onto the aqueous sample is changed by the sample and/or by a/the non-aqueous substance (in particular: partially absorbed) such that merely components of the same (in particular: not absorbed, i.e. transmitted components—however also components reflected by the sample in the reflection arrangement are conceivable) are incident on the receiver section, i.e. are receivable by the latter.

Detection in the transmitter section can in particular be an image detection. In particular, the TS are therefore detected in the receiver section in the form of images, i.e. photographed. The detected TS are subsequently therefore termed alternatively also image recordings, image information or even image data. In particular, this can concern two-dimensional images which are produced by a THz area sensor of the receiver section on the basis of the TS arriving at the receiver section (2D image data generation from the TS detected by the receiver section).

The transition (e.g. the conversion) of the sample from one to the other aggregate state, in particular the water components therein) need not thereby definitely be complete. For example, complete melting of a previously completely frozen sample is therefore not necessary, but rather it suffices possibly that merely parts of a previously completely frozen sample are melted, or that an already partially melted sample melts completely. Likewise, in the reverse direction, possibly also a partially (e.g. in regions) freezing of the aqueous sample suffices.

The transition can take place passively, i.e. take place without intervention: e.g. melting of an already frozen sample (at room temperature). Or it can be caused or effected actively: e.g. freezing (in particular: quick-freezing) of the sample in a freezing unit section of the system. The transition thereby takes place preferably from the liquid into the solid aggregate state (or is effected in this direction), i.e. the sample is frozen.

In the case of a plurality of different (transition) states, this can mean, in the extreme case, that merely two images of the sample are recorded and evaluated in a different state. Generally, an image series of a large number (e.g. 10, 50, 100) of images in different transition states will however be recorded (in particular therefore temporally in succession) which are then evaluated.

The times can follow each other at regular time intervals. For example, the constant interval of respectively temporally adjacent THz image recordings can assume a value between one second and ten seconds (including threshold values) during quick-freezing of goods to be deep-frozen. Or the constant interval of respectively temporally adjacent THz image recordings can assume a value between one minute and ten minutes (including threshold values) during the thawing of a frozen item. Entire image series (preferably at such regular time intervals of respectively temporally adjacent images) of ten or more, preferably of 50 or more, particularly preferably of 100 or more, images can be recorded by means of the receiver section or by means of receivers of the same (e.g. individual THz cameras).

The freezing section can have one or more freezers (e.g. plate freezers, cold air freezers or cryogenic freezer(s)) or consist thereof. The thawing section can comprise one or more oven/ovens or microwave appliance(s) or consist thereof. In turn a plurality of said elements can thereby be elements, e.g. of a production line, which are positioned at a spacing from each other spatially for freezing or thawing. In this respect, see also the embodiments.

The size can thereby be an average size (median or mean value), a minimum size and/or also a maximum size.

Such a transmission arrangement generally implies that the sample is positioned between the transmitter section and the receiver section: the transmitter section (or a part of the same, e.g. an individual transmitter) radiates the electromagnetic radiation onto the sample, this radiation is transmitted partially through the sample and thereby (e.g. by absorption, scattering or the like) is attenuated and at least components of the residual radiation emerging from the sample are detected as radiation components TS by the receiver section (or by a part of the same, e.g. by an individual receiver).

Basically, also a system in reflection arrangement is however conceivable: the transmitter section (or a part thereof, e.g. an individual transmitter) radiates the electromagnetic radiation onto the sample, this radiation is reflected at least partially by the sample, e.g. by reflection or scattering (after a radiation modification on/in the sample or through it) and at least components of the reflected radiation are detected as radiation components TS by the receiver section (or by a part of the same, e.g. by an individual receiver).

Difference images of image recordings recorded at different times (i.e. at different sample states) are generated and evaluated by means of the evaluation section. For example, in the difference images, those image regions, the average difference value or intensity- or amplitude value of which is above an (upper) threshold value $t_{above}$ (subsequently, change regions) of those image regions (subsequently: constancy regions), the average difference value or intensity- or amplitude value of which is below this threshold value $t_{above}$ or also below a (lower) threshold value $t_{below}$ with $t_{above} > t_{below}$ can thereby be differentiated The change regions can be regions of the sample in which no non-metallic, non-aqueous substances (or undesired foreign bodies or impurities) are present, i.e. the aqueous sample is present in non-impure form. The constancy regions can be regions (of the sample) in which undesired foreign bodies or impurities are present. This differentiation is based on the assumption that, by means of the transition process, changes in the permittivity for the THz radiation, which are merely in the (actual) sample itself, take place, however not in the case of foreign bodies or impurities. Thus water, e.g. in liquid form, has a significantly lower transparency (i.e. permittivity) for THz rays, than in frozen, i.e. crystalline form (i.e. as ice), where it is (virtually) transparent.

While the transition of the aqueous sample from the liquid aggregate state to the solid aggregate state (or vice versa) takes place, there can therefore be effected respectively for the plurality of different states of the aqueous sample or at those times at which respectively the modified radiation components are detected by means of the receiver section, in addition (viewed in comparison to the THz radiation) a high-resolution optical imaging of the sample. The optical recordings thereby reflect respectively the same state of the sample as the (simultaneous) imaging with THz radiation.

The optical images can likewise be evaluated by means of the evaluation section and be fused with the THz images. The imaging device can be used in particular also for the image recording of different THz images relative to each other (this can be necessary if, during the recording of individual images of a THz image series, individual components of the sample are displaced relative to each other, e.g. precisely also as a result of said transition of the sample).

The imaging device can comprise in particular an imaging area sensor (camera system), e.g. a CCD- or CMOS area camera. The visible range thereby comprises the wavelength range between 350 nm and 750 nm (including the threshold values) or sections thereof. The receiver section and the imaging device must thereby generally be calibrated geometrically relative to each other.

For this purpose, subsequently also the abbreviation SiGe transceiver is used.

A simple example according to the invention for such a unit is a production unit with precisely two transmitter-receiver pairs along a cooling chain, firstly, with the first pair, THz images of the sample (e.g. of deep-frozen pizza or deep-frozen pizzas) in the unfrozen state are recorded and the sample is subsequently transported further by a conveyer belt as transport device, before finally, with the second pair, THz images of the sample in the quick-frozen state are recorded. Then difference images of the two recorded images are produced and evaluated for each sample example. The transport device can therefore comprise e.g. a conveyer belt on which the samples pass through different sections of the unit.

The millimetre waves used by the present invention are able, because of their longer wavelength, to penetrate partially into materials and hence permit a view into the product, irrespective of whether it is packaged or not. Because of its ability to measure, in addition to the amplitude, also the phase, the system according to the invention can also resolve very small contrast differences. From a frequency of approx. 100 GHz to 200 GHz, structures up to 1 millimetre diameter can be resolved. For the food testing, impurities from a millimetre diameter must be able to be detected. This frequency range can be covered, according to the invention, by the use of SiGe (silicon-germanium) circuits.

The phase of the transmitted or reflected radiation is jointly measured inherently with the THz system according to the invention and can be used for the further processing methods as additional channel and be evaluated in the same way as the amplitude. Because of any possible ambiguities during phase measurements, methods of the so-called phase development can thereby be applied to the measured phase values. Alternatively, from a plurality of measurements using different frequency bands in the high-frequency range, also the signal running times can be calculated from the phase information so that a phase development can be dispensed with. In this case, the signal running time can be regarded as additional image channel and be further processed in the same way.

The system according to the invention can hence be produced competitively. However, millimetre waves in said frequency range are basically absorbed very greatly by water molecules. Imaging would result in very low-contrast images with a poor signal-to-noise ratio. The resulting images would contain little information with respect to the problem to be solved, presumably would have ambiguities and would not be able to be used for inspection of aqueous foods because of the lack of specificity. In order nevertheless to make aqueous foods accessible for testing with the technology according to the invention, the present invention provides the following procedure: the temperature of the foods is specifically changed so that a thawing or freezing process takes place.

Figure 1:
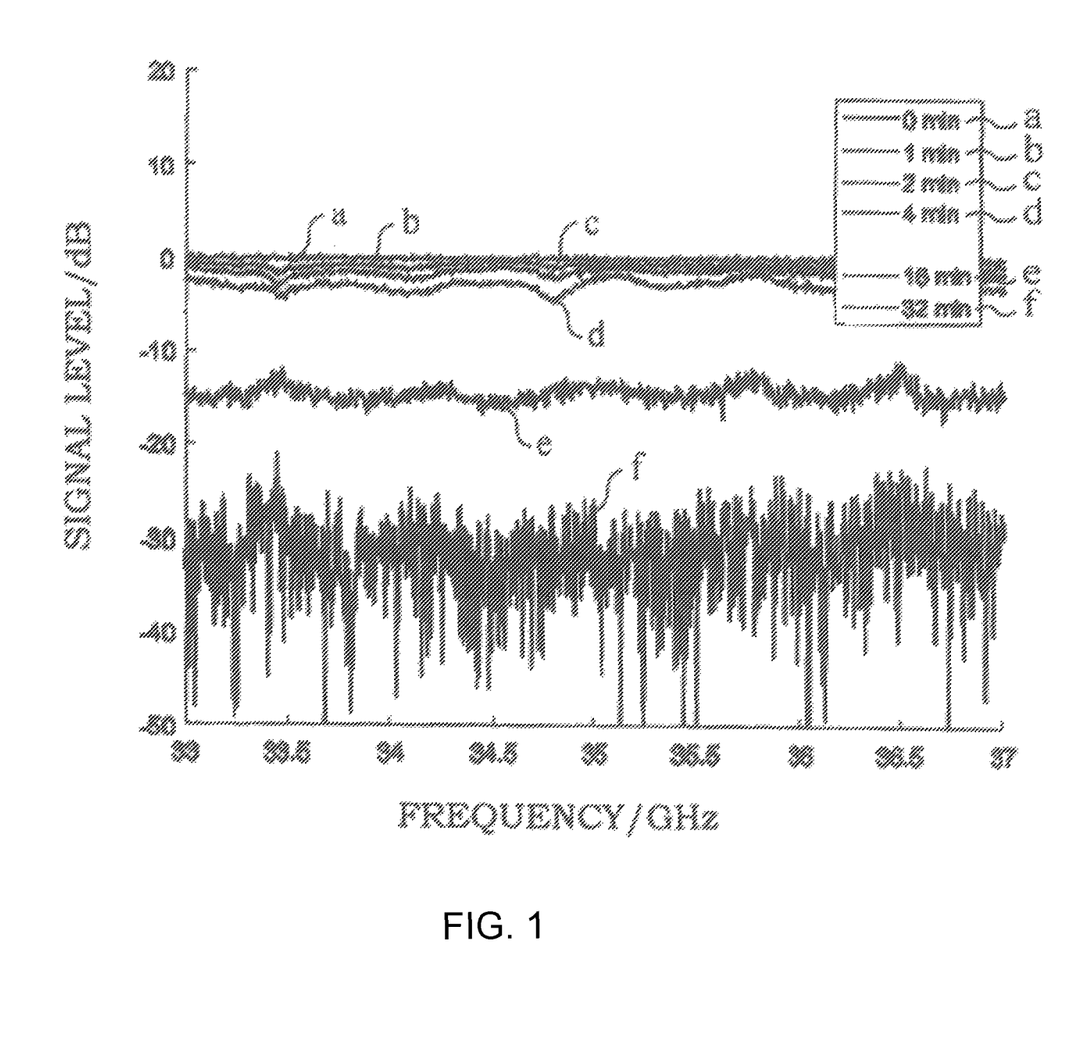
FIG. 1 shows amplitude courses of aqueous food components.

Meanwhile, a series of inspection images in the indicated frequency range is recorded. Frozen water assumes a crystalline form and consequently loses its ability to vibrate. The electromagnetic waves are not absorbed and the frozen foods are transparent for microwaves (see FIG. 1). FIG. 1 shows amplitude courses of aqueous food components for different times (in minutes "min") during a thawing process and different wavelengths or frequencies. It should be noted that the permittivity during the thawing reduces increasingly starting from total transparency (t=0 min).

Such a series thereby comprises at least two images, a maximum number of images per series is not limited. Advantageously, e.g. 20, 50, 100 or 200 images per series can however be recorded. Determination of the parameters can be effected as follows: from the recorded image series, features (i.e. parameters) can be calculated with various methods of image processing which are known per se (and their combination). Examples hereof are:

The permeability (i.e. the amplitude during the transmission operation) of the individual components for different temperatures (corresponds to the physically motivated model approach).

The change in the recorded channels over the process of temperature change (i.e. a derivative formation).

The shape and texture of individual areas, delimited from each other (i.e. one or more common texture features from the image processing, i.e. for example statistical features, such as average, variance within a specific image window, grey value transition matrices, gradient histograms, local binary patterns, texture energy measures according to Laws (corresponds to data-driven model approach).

See in this respect for example:
[1] Ludwig Abele. Statistische und strukturelle Texturanalyse mit Anwendungen in der Bildsegmentierung (Statistical and structural texture analysis with applications in image segmentation). Dissertation, Technical University Munich, 1982.
[2] Navneet Dalal und Bill Triggs. Histograms of Oriented Gradients for Human Detection. In Proc. IEEE Conference on Computer Vision and Pattern Recognition, vol. 1, pages 886-893, June 2005.
[3] Robert Haralick, K. Sam Shanmugam und Its'hak Dinstein. Textural features for image classification. IEEE Transactions on Systems, Man, and Cybernetics, 3(6): 610-621, November 1973.
[4] Kenneth Laws. Rapid texture identification. In Proceedings of the Seminar on Image Processing for Missile Guidance, pages 376-380. SPIE, 1980.
[5] Topi Mäenpää, Matti Pietikäinen und Timo Ojala. Texture classification by multipredicate local binary pattern operators. In Proc. 15th International Conference on Pattern Recognition, vol. 3, pages 939-942, 2000.
[6] Majid Mirmehdi, Xianghua Xie und Jasjit Suri (Ed.). Handbook of texture analysis. Imperial College Press, 2008.

Figure 2:
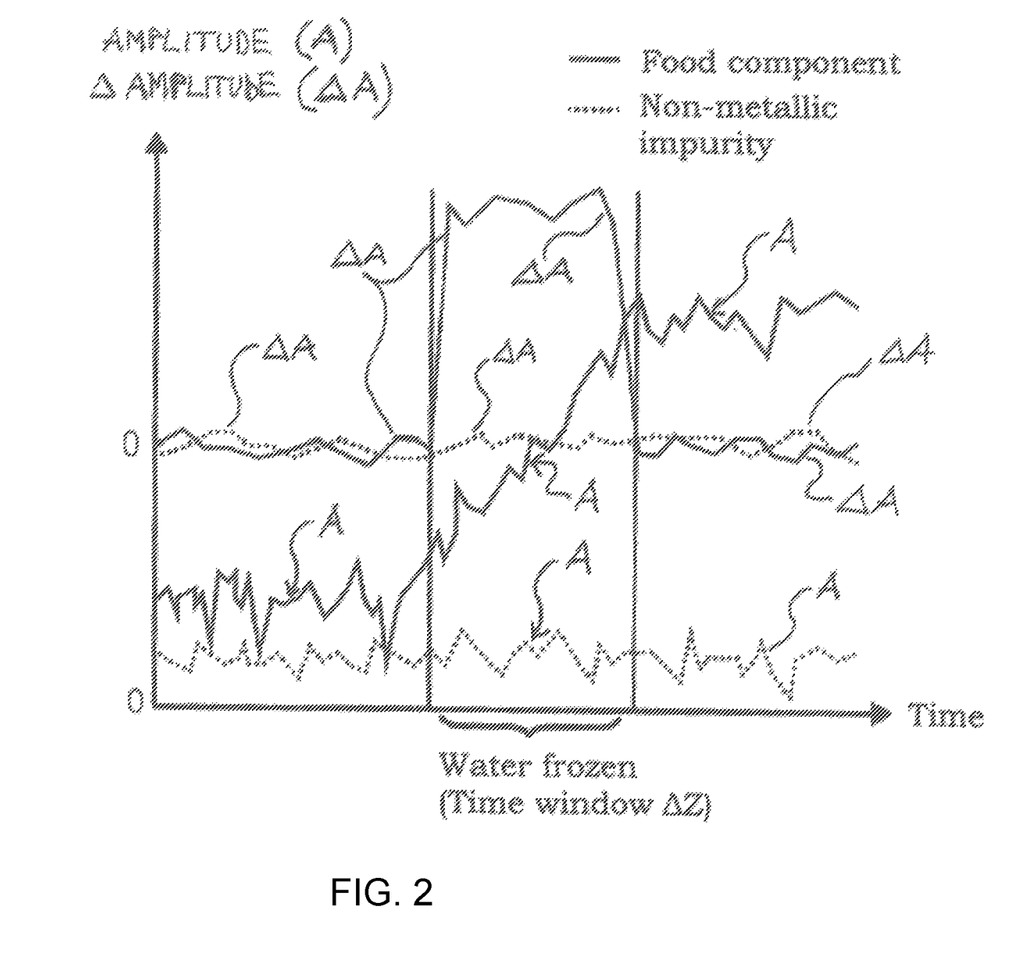
FIG. 2 shows temporal courses of amplitude and of smoothed amplitude differences.

Water and hence most food components change their permittivity according to aggregate state—in contrast, impurities maintain their permittivity. A subsequent automated evaluation system (cf. the evaluation section of the invention) can examine the complete recorded image series. Since the thawing- or freezing process changes only the permittivity of the food components, non-metallic impurities are highlighted in particular by appearing in the complete image series with the same intensity. The non-metallic impurities differ therefore in the core due to a virtually constant permittivity over a specific temperature range. Processing of the entire image series, e.g. by means of difference value formation, also allows, in the case very non-homogeneous foods (e.g. vegetable mixtures, pizzas, etc.), detection of non-metallic impurities despite the greatly varying contrast courses (cf. also FIG. 2): FIG. 2 shows a temporal course of an amplitude and a smoothed amplitude difference (result of a difference value formation between the individual recordings of an image series, denoted with A amplitude or AA) for food components and non-metallic foreign bodies during a freezing process. In the marked time window $\Delta Z$, the amplitude difference $\Delta A$ allows detection of impurities.

The signal designated with $\Delta A$ originates from a difference value formation between the individual recordings of an image series, i.e. corresponds to an approximation of the first derivative of the amplitude course. Smoothing can be implemented for example via a temporal average formation within a (sliding) time window. The individual values within the window can thereby also be weighted differently (e.g. Gaussian bell curve). The calculation of n (with n=whole number, e.g. n=100) inspection images can comprise:
  possibly recording of the individual images relative to each other (if the test piece or the sample was moved between the recordings or components have moved due to the temperature change).
  calculation of the course of the individual channels measured by means of the high-frequency sensor system (amplitude, phase, signal running time) and possibly the derivative thereof (cf. FIG. 2).

The optical imaging can assist the detection of impurities during recording of the individual recordings relative to each other since their lateral resolution is significantly higher than that of the THz- or high-frequency sensor system. In addition, the information of the optical imaging can be used for the purpose of identifying contiguous areas of the sample or of the test piece, obtaining additional texture information in the visible range of the spectrum etc.

Figure 3:
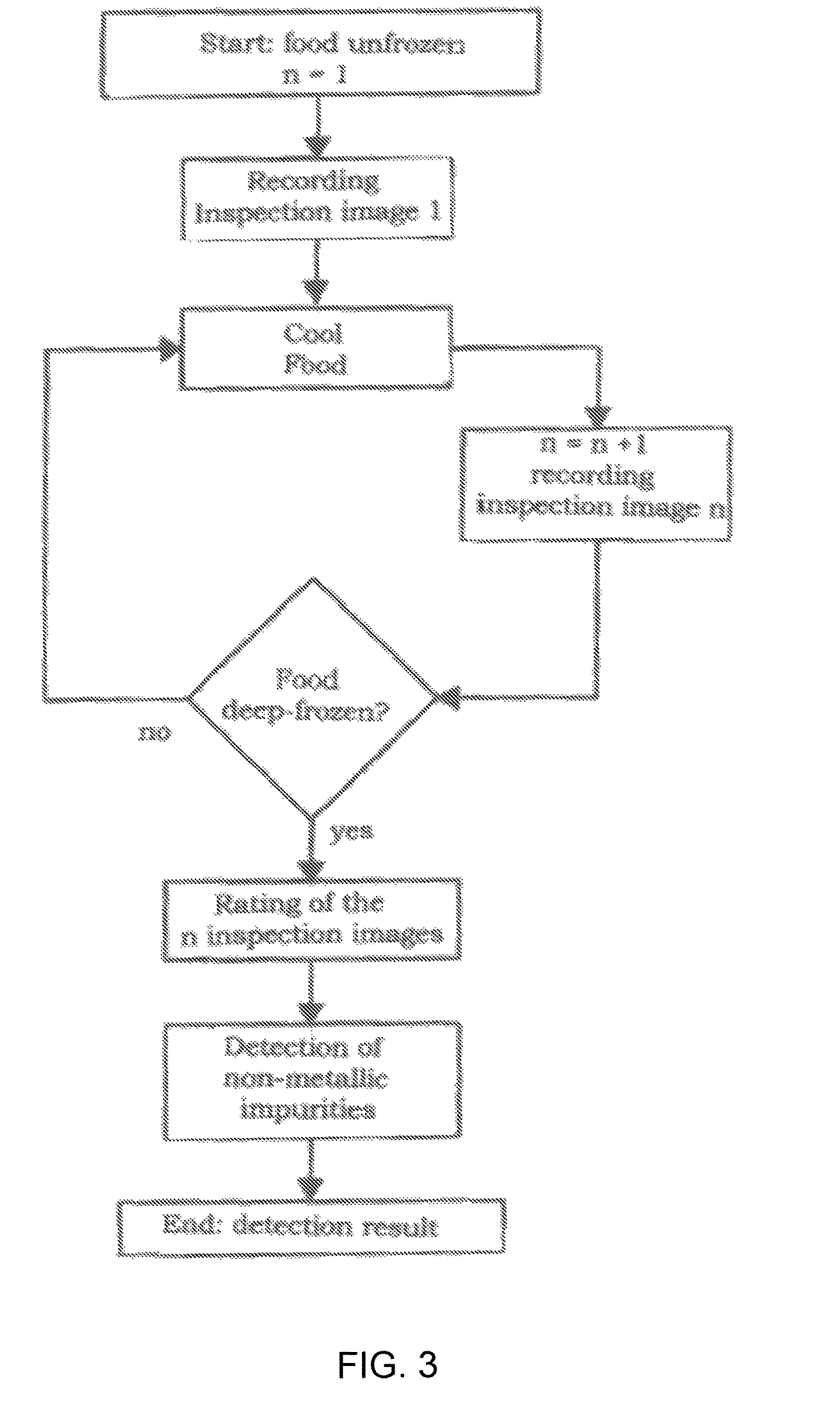
FIG. 3 shows a course diagram of a method according to the invention.

One possibility of how a system according to the invention can operate (controlled e.g. by a computer system or a PC—as component of the or comprising the evaluation section—with control- and evaluation programs stored in its memory and suitably configured) according to what was said previously on the basis of a microprocessor and program, is shown by the flow chart of FIG. 3 with the example of a freezing process of the sample(s). Further possibilities according to the invention and also methods of image processing which can be applied according to the invention are explained subsequently.

In addition to the sensors for the THz- or high-frequency imaging, also an imaging camera sensor in the visible range (e.g. area camera in combination with suitable lens system) can be used. These sensors typically have a significantly finer spatial resolution than the high-frequency sensors. The camera sensor can be used therefore, on the one hand, to assist detection of impurities and, on the other hand, to deliver high-resolution image data which are advantageous for the subsequently described recording of the high-frequency recordings obtained during the freezing process.

According to the invention, the following methods of image processing (1. to 3.) can be used for detecting non-metallic impurities or can be implemented in the system according to the invention by means of computer programs.

1. Recording

In order to further process the obtained image series suitably, possibly firstly recording of the image data can be required. During the freezing process, the result can be for example, because of a mechanical movement or conveyance of the food as sample, that it is orientated differently with respect to the imaging systems. Within the scope of the recording, the individual recordings of the image series are made congruent again by means of a geometric transformation. The transformation thereby operates on the complete image recordings.

The course of the geometric transformation can be as follows: a point of the testing scene $p=(p_x, p_y, p_z)^T$ is imaged during the data recording both on a pixel $h=(h_m, h_n)^T$ of the high-frequency sensor system and on a pixel $k=(k_m, k_n)^T$ of the additional (camera) sensor system or detected by these. A geometric transformation $T(\bullet)$, which represents the imaging processes of coordinate system high-frequency sensor system to world coordinates of the testing scene to coordinate system of the additional sensor system, makes it possible to determine the corresponding pixel or pixels $k=T(h)$ for a pixel h of the high-frequency sensor system.

In addition, the movement effects or the aggregate state change itself can lead to only individual components of the food changing their position between the recordings. This is conceivable, in particular with foods with very heterogeneous ingredients, such as for example a pizza (e.g. base covering under a mushroom or a tomato freezes faster, mushroom or tomato rolls to the side). In this case, during recording, in fact individual components or ingredients of the food should be able to be detected and assigned via the diverse image recordings securely to each other so that the corresponding image values of the individual images can be processed suitably together.

This can be solved by the combination of the state of the art of segmentation processes, known per se, with tracking processes. Examples of segmentation processes which can be used according to the invention are as follows:

1. region-orientated methods, such as, e.g. directly by means of sensor values, by means of so-called "region growing".
2. edge-orientated methods
   a. gradient filter (edge filter)
   b. water separation transformation
   c. active contours (gradient vector flow, vector field convolution)
   d. method according to Mumford and Shah
   e. graph-cut methods.

Such segmentation methods can be deduced from the following documents:

[1] Ludwig Abele. Statistical and structural texture analysis with applications in image segmentation. Dissertation, Technical University Munich 1982.

[7] Stephan Bischoff and Leif Kobbelt. Parameterization-free active contour models with topology control. The Visual Computer, 20(4): 217-228, 2004.

[8] Laure Blanc-Féraud, Pierre Charbonnier, Gilles Aubert and Michel Barlaud. Nonlinear image processing: modelling and fast algorithm for regularization with edge detection. In Proc. IEEE International Conference on Image Processing, vol. 1, pages 474-477, October 1995.

[9] Yuri Boykov and Gareth Funka-Lea. Graph cuts and Efficient N-D Image Segmentation. International Journey of Computer Vision, 70(2): 109-131, 2006.

[10] Bing Li and Scott Acton. Active contour external force using vector field convolution for image segmentation. IEEE Transactions on Image Processing, 16(8): 2096-2106, August 2007.

[11] Fernand Meyer. Topographic distance and watershed lines. Signal Processing, 38: 113-125, 1994.

[12] David Mumford and Jayant Shah. Optimal approximations by piecewise smooth functions and associated variational problems. Communications on Pure and Applied Mathematics, 42(5): 577-685, July 1989.

[13] Nobuyuki Otsu. A Threshold Selection Method from Gray-Level Histograms. IEEE Transactions on Systems, Man, and Cybernetics, 9(1): 62-66, January 1979.

For useable tracking methods, see e.g.:

[14] Yilmaz, Alper, Omar Javed and Mubarak Shah. "Object tracking: A survey." Acm computing surveys (CSUR) 38.4 (2006): 13.

Precisely for the described object of recording, the already described, additional, high-resolution optical area sensor can be of additional use. However, also a geometric calibration of both sensors (i.e. of the THz sensor and of the optical sensor) relative to each other is then generally required. There can be used for this purpose a corresponding calibration object on which patterns are applied, which produce a sufficient contrast both in the visible spectrum and in the millimetre wave spectrum.

2. Image Fusion and Feature Extraction

After recording, a pixel (x, y) corresponds in all recordings of the image series to the same object region of the food to be tested. Now suitable methods of image fusion can be used for the purpose of fusing (combining) the respective information of the individual recordings.

The image fusion can be effected at various abstraction levels:
   fusion of the signal values of individual recordings,
   fusion of features calculated from the crude values or
   fusion of the decisions obtained on the basis of the features with respect to individual recordings.

Methods of image fusion which are suitable in this respect are as follows:
1. fusion at signal level
   a. After completion of the geometric transformation, for each point of the test scene detected by all sensor systems, the signal value vectors (=all channels of the individual sensors) of the different sensors can be linked together (concatenated) in order to obtain a higher-dimensional vector. This can also be effected via the individual recordings.
   b. Alternatively, as described previously, the temporal course on this level can in fact be detected by a computer derivation approximation.
2. fusion at feature level
   a. as in 1.a.
   b. as in 2.a, however it must be tested for each feature whether a temporal calculation is meaningful.
3. fusion at decision level
   a. Majority decision with respect to all data points which were characterised as contiguous in the segmentation step: if the majority is recognised as foreign bodies, the complete contiguous area is classified as foreign bodies.
   b. Minimum decision: if at least t of the data points belonging to a contiguous area were classified as foreign bodies, then the complete area is classified as foreign bodies. The value t is an adaptable threshold.

In addition, the image fusion can also be implemented on different scales (so-called image pyramid methods). Such image pyramid methods can be:
   a. Gaussian pyramids
   b. Laplace pyramids
   c. Pyramid linking
   d. Wavelet analysis See also in this respect:

[15] Werner Bäni. Wavelets: An introduction for engineers. Oldenbourg, Munich, $2^{nd}$ edition, 2005.

[16] Peter J. Burt and Edward H. Adelson. The Laplacian pyramid as a compact image code. IEEE Transactions on Communications, 31(4): 532-540, April 1983.

[17] Peter J. Burt, Tsai-Hong Hong and Azriel Rosenfeld. Segmentation and estimation of image region properties through cooperative hierarchical computation. IEEE Transactions on Systems, Man and Cybernetics, 11(12): 802-809, December 1981.

The fusion operator which calculates the crude values of the individual images together should be adapted specially for detection of non-metallic impurities. Possible variants for this operator are:
   determination of the maximum/minimum permittivity of a pixel over the entire image series,
   estimation of the first derivative (calculation of the change) in permittivity of a pixel over the entire image series,
   estimation of the second derivative of the permittivity of a pixel over the entire image series, or
   concatenation of the permittivities of all temporal steps (all recordings of the image series) to form one vector (subjected to image fusion).

The values resulting from the image fusion can be used directly as features for the classification.

In addition, also information which is contained in the local intensity distribution (local features or texture) can be used as features. For example, the average intensity value, the variance of the intensity value or even more complex features, such as local binary patterns or characteristic values of grey value transition matrices for local sections of the obtained inspection images can be calculated.

3. Classification

In order to come to the decision as to whether non-metallic impurities are present, the features extracted from the image data are preferably classified by a corresponding classifier. The model of the classifier can be learned either completely by means of training data or originate from a physically motivated model.

Useable classifications are:
a. Gaussian classifier,
b. decision trees,
c. support vector machines, or
d. neuronal networks.

See in this respect:
[18] Christopher Bishop. Pattern recognition and machine learning. Springer, 2006.
[19] Richard Duda, Peter Hart and David Stork. Pattern classification. Wiley, $2^{nd}$ edition, 2001.

A data-driven model learning (training data-based) can be effected as follows: a sufficiently large quantity of foods is provided specifically with non-metallic impurities and deep frozen with observation by means of the described sensors. A user (person) marks the impurities in the individual recordings manually so that this information is available in the subsequent processing steps. After completion of the recording and image fusion or feature extraction, a classifier (a model) is trained with respect to being able to detect non-metallic impurities. It can thereby be learned by means of training data as follows, training data-based: example data sets are recorded which comprise all those food components which are to be expected in later use of the system according to the invention. In addition, foreign bodies are introduced artificially at known positions. Since the positions of the foreign bodies are known, the corresponding areas can be characterised as such in the resulting data sets. Now feature vectors for foreign body data sets and non-foreign body data sets are available, by means of which the classifiers can be trained.

A physically motivated modelling or model generation can be effected alternatively as follows: the freezing process and the accompanying change in permittivity of (aqueous) foods and non-metallic impurities can be modelled physically. From this model, features which are then suitable for classification can be derived. For example the temperature-dependent change in permittivity can be used as feature. Since the ambient temperature is known for each obtained recording and the permittivity can be determined from the crude data at each image point, an estimation can be output in turn for each image point as to whether, according to the model, this thereby concerns a food or a non-metallic impurity. A physical model can be thereby produced as follows: for all food components which would be expected for a planned application in the system according to the invention, the course of the electromagnetic permittivity can be determined for the temperature span to be run through. In the testing system, the measured permittivity courses can be then compared, during the temperature change, with the previously determined data in order to be able to differentiate between foreign bodies and food components.

The present invention produces an economic system for detection of non-metallic impurities in aqueous foods. The foods, apart from the freezing process, which is generally provided anyway, are neither destroyed, heated, contacted, ionised or stressed in any other way. As a result,
increased quality standards can be ensured,
the quality of foods can be increased,
high-quality foods can be offered at more favourable prices and
the quality of food deliveries can be tested.

The measuring system can also be produced in reflection (cf. subsequent third embodiment) instead of in transmission (cf. subsequent embodiments one and two). Transmitter section and receiver section (or the associated transmitters or receivers) are thereby applied on the same side of the food to be tested and the high-frequency radiation reflected by the food is measured.

With respect to the food to be tested, in a very simple case according to the invention by means of the system according to the invention, a test image can be recorded directly after production in the non-frozen state and, at a later time at another location along the cooling chain, a test image in the frozen state. These two images can be evaluated or compared by means of the evaluation section. The THz image recording of the system can also be uncoupled into two parts (or the system can have two sub-systems, the data of both sub-systems then being able to be used together).

The sample to be tested is not tampered with during testing. Further characteristic features of the invention are: the use of an imaging high-frequency system in transmission (or also reflection), recording of a plurality of test images (e.g. during the continuous deep freezing of the food to be tested) and the combined evaluation of the plurality of test images of the imaging high-frequency system (the test images generally being obtained in different aggregate states of the test piece).

The present invention can be used wherever non-metallic impurities (e.g. from 1 mm diameter) in aqueous foods are intended to be or must be detected non-destructively, economically and without the use of ionising radiation. For example, the following scenarios may be mentioned:

An aqueous food is produced which must be produced in large quantities because of a small profit margin. The value of the finished product does not allow use of human visual testers for quality control. However, as a result of the process, the result can be impurities with non-metallic foreign bodies. Here, the system can be used on the basis of its high operating speed and the economic practicability.

In the production of a food, as a result of the process, the result is non-metallic impurities which cannot be differentiated from the food itself in the visible spectrum (perceivable by humans). The use of human visual testers is hence not possible. Within the spectrum of millimetre waves, a differentiation of food and foreign bodies is probable, for which reason the present invention can enable automated quality control in this case.

An aqueous food which comprises, as desired component, microorganisms which are also retained after a freezing and thawing process is produced. In addition, the result, because of the process, is occasionally non-metallic impurities and the use of human visual testers is either economically not sensible and/or not possible on grounds of reliability. In this case, an X-ray system cannot be used for the testing since the ionising radiation could destroy the microorganisms. Testing by the present invention has no biological effect and can hence manage the testing task.

An end customer would like to prepare a deep frozen pizza. His oven is equipped with an inspection system or system for detection based on the present invention. When baking the food, the temperature thereof is increased specifically. If in the meantime an image series is recorded in the millimetre wave range and correspondingly evaluated, non-metallic impurities can be detected and the consumer can be warned. The end customer can hence be protected both from food impurities which were not discovered during production and also from those which passed into the food during transport.

Subsequently, the invention is illustrated with reference to embodiments.

With respect to FIGS. 1 to 3, see in fact what was described above.

Figure 4:
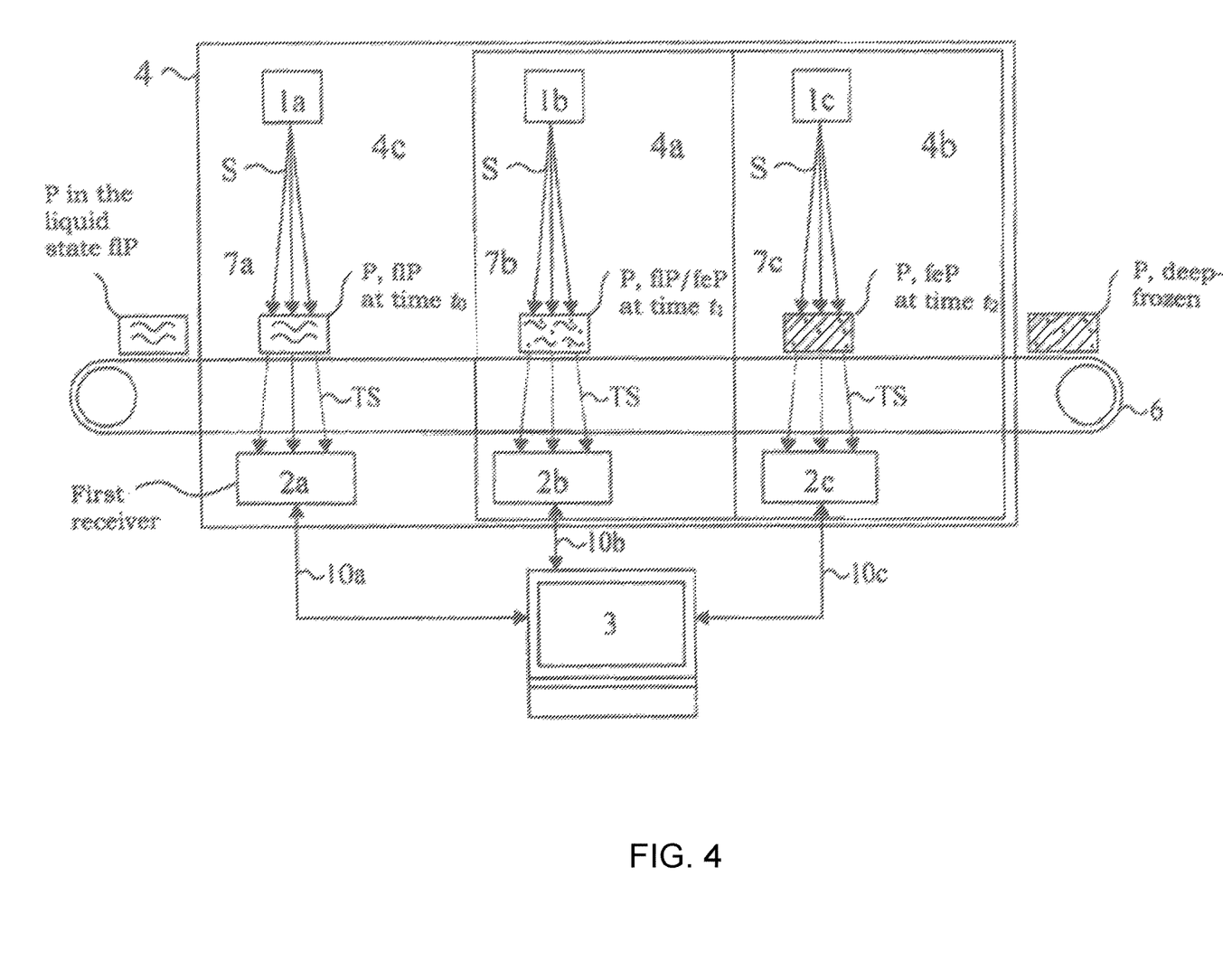
FIG. 4 shows a construction, given by way of example, for a first system according to the invention in a transmission arrangement.

In FIG. 4, the transmitter section 1 has a plurality (here: three) of individual transmitters, namely a first transmitter 1a, a second transmitter 1b and also a third transmitter 1c. Each of these transmitters emits electromagnetic radiation S in the THz range. The individual transmitters 1a to 1c are disposed at a spacing from each other along the transport path of a conveyor belt 6 (transport device for transport of samples P).

Said conveyor belt 6 passes through (with the sample(s) P which is/are placed thereon and transported) a convertor section of the system which is configured here as cooling section 4 for freezing the sample P situated firstly in the liquid state fIP. The sample P enters, in the liquid state fIP and lying on the conveyor belt 6 (along the transport direction of the same and hence also in the transport direction of the sample P, cf. arrows), firstly into a prechamber 4c of the cooling section 4. In this prechamber 4c, the first transmitter 1a and also the receiver 2a belonging thereto are situated (cf. subsequently to the receivers). Then the sample P on the conveyor belt 6 passes through the precooling section 4a of the cooling section 4, the second transmitter 1b together with the receiver (second receiver 2b) belonging thereto being disposed in the precooling section 4a. Finally, viewed in transport direction, the sample P passes through the quick-freezing section 4b of the cooling section 4. In the quick-freezing section 4b, the third transmitter 1c together with the third receiver 2c assigned thereto is situated. The illustrated system according to the invention is hence "inline", i.e. configured as production unit or within a production unit.

Opposite each of the three transmitters 1a to 1c (on the side of the conveyor belt 6 situated opposite the transmitter) there is situated respectively precisely one receiver such that the THz radiation S emitted by the respective transmitter (at a time at which the sample P is positioned, on the one hand, between the respective transmitter and, on the other hand, the receiver assigned thereto) radiates through the sample P before it passes through the conveyor belt 6 and finally arrives at the respective receiver. The respective receiver detects, from said electromagnetic radiation S, the radiation components TS which are modified by the sample P. The radiation modification is thereby restricted to the sample P or at least essentially to the sample P, i.e. the modification of the radiation S by the conveyor belt 6 is subtracted out or is negligible.

The modified THz radiation components which are recorded or detected by the respective receivers 2a to 2c hence concern THz radiation components TS transmitted through the sample P, i.e. those radiation components which, after transmission through the sample P (in the respective frozen state), viewed in the radiation direction from the respective transmitter to the respective receiver, remain still in the beam path on the beam exit side of the sample P (which have therefore neither been absorbed in the sample nor scattered or reflected by the sample).

The spatial regions, which have been passed through by the sample P at those different times t at which the sample, viewed in the transport direction, is situated respectively at the level of precisely one of the transmitter-receiver combinations 1x-2x (with x=a, b or c), are provided with the reference numbers 7a to 7c.

More precisely, at a first time $t_0$, the sample P (here e.g. a deep frozen pizza) is found in the liquid state fIP precisely in the spatial region 7a between the first transmitter 1a and the first receiver 2a which is assigned to it on the opposite side of the conveyor belt 6. The THz radiation S emitted by the first transmitter 1a is hence modified, according to the liquid state of the sample P, into a transmitted beam component TS which is received by the first receiver 2a.

At a later time $t_1$ (with $t_1 > t_0$ corresponding to the feed speed of the conveyor belt 6), the sample P is in a transition state, namely in a partially deep frozen state which is effected by means of the section 4a and designated with fIP/feP. This state is therefore reached in the spatial region 7b within the precooling section 4a or in the spatial region 7b between the second transmitter 1b and the second receiver 2b. The radiation components TS of the second transmitter 1b, transmitted at the time $t_1$ through the sample P, i.e. the radiation TS detected by the receiver 2b, hence reflects the state fIP/feP of the sample P.

Finally, entirely analogously at an even later time $t_2 > t_1$ at which the sample P is already completely frozen feP in the quick-freezer 4b, a further image recording is effected by the radiation TS emitted by the third transmitter 1c and transmitted through the spatial region 7c and the sample P situated therein at the time $t_2$ being detected by the third receiver 2c assigned to the third transmitter 1c.

The receiver section is subsequently designated with the reference number 2 and comprises the three receivers 2a to 2c.

The sample P finally leaves the cooling section 4 after passing through the section 4b in order to be assembled (packaged) and transported away.

The evaluation section is produced in its memory in FIG. 4 as PC 3 with suitable control- and evaluation programs. The PC 3 is respectively connected to a bidirectional data- and control line (lines 10a to 10c) with each of the receivers 2a to 2c. Via these lines 10a to 10c, the receivers of the receiver section 2 are actuated, with respect to the manner of their radiation detection (e.g. with respect to their amplification- or sensitivity step and the like). Likewise, via these lines 10a to 10c, the transmitted radiation components TS detected respectively by the individual receivers 2a to 2c are transmitted in the form of measurement signals to the PC 3 for evaluation thereof.

Figure 5:
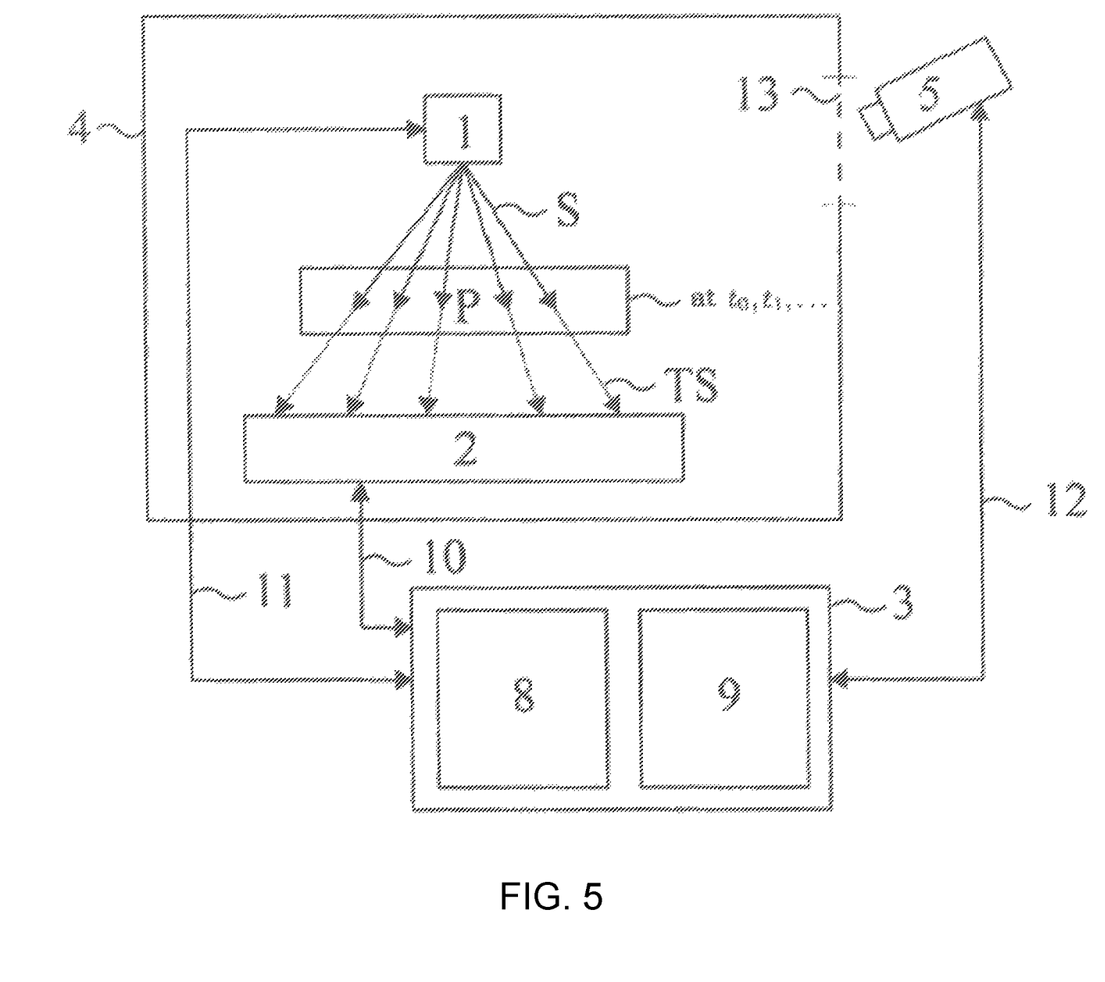
FIG. 5 shows a construction, given by way of example, for a second system according to the invention in a transmission arrangement.

A further system of the invention which is configured basically just as the system shown in FIG. 4 so that subsequently only the differences are described, is shown by FIG. 5 (identical reference numbers hence correspond to identical or corresponding features of FIG. 4).

Differently from FIG. 4, the system of FIG. 5 only comprises precisely a single transmitter-receiver combination 1-2 with precisely one THz transmitter 1 as transmitter section and precisely one receiver 2, disposed opposite the latter in transmission positioning, as receiver section. The sample P is positioned stationary in a spatial region 7 between transmitter 1 and receiver 2. The element 4 is here an oven for thawing the sample: the sample P is hence thawed (slowly) so that the different sample states at the different times $t_0 < t_1 < t_2 < t_3$ . . . can be detected at the same location 7 in the transmission arrangement.

The radiation components TS detected respectively by the receiver 2 at these times are conveyed to the PC 3 as measurement signals via the bidirectional data- and control line 10 which connects the receiver 2 to the evaluation section 3 likewise configured as PC. Just as in FIG. 4, the PC 3 controls the receiver 2 via the line 10. In FIG. 5, also a bidirectional control- and data line 11 is shown in addition, which connects the PC 3 to the transmitter 1. Via the latter 11, the PC 3 controls the adjustments of the transmitter 1 and receives feedback transmitted from the latter about its operating state or the like. (For reasons of overview, corresponding control- and data lines are not shown in FIG. 4, however the PC 3 also controls the transmitters 1a to 1c in FIG. 4 and receives feedback signals from these).

The PC 3 comprises a timer 8, with the help of which resolution of individual recordings of the THz image series to be recorded is controlled at the individual times $t_0$, $t_1$, $t_2$, . . . . The reference number 9 characterises the memory of the PC 3, the control programs, stored therein, for the elements 1 and 2 and also the evaluation programs, likewise stored therein, for evaluating the different radiation components TS detected at different times t.

Differently from FIG. 4, the system of FIG. 5 according to the invention also comprises an additional optical imaging device 5 (here: CCD camera; however a CMOS camera can also be used), with which the sample P can be detected optically at the recording times $t_0$, $t_1$, . . . of the THz images respectively additionally with high resolution (pixel size, e.g. 3 μm×3 μm), i.e. in a significantly higher spatial resolution than in the THz wavelength range. The image size of the device 5 can be for example 5,120×4,830 pixels. The oven 4, in order to enable optical observation of its interior or of the sample P, has an optically transparent window 13 or similar. The device 5 is connected to the PC 3 via a bidirectional control- and data line 12 for control and for data exchange. The optical images recorded by the camera 5 at the respective time are matched with the associated THz images recorded respectively at the same time with respect to position (situation and orientation) in the PC 3 by the evaluation programs 9.

Figure 6:
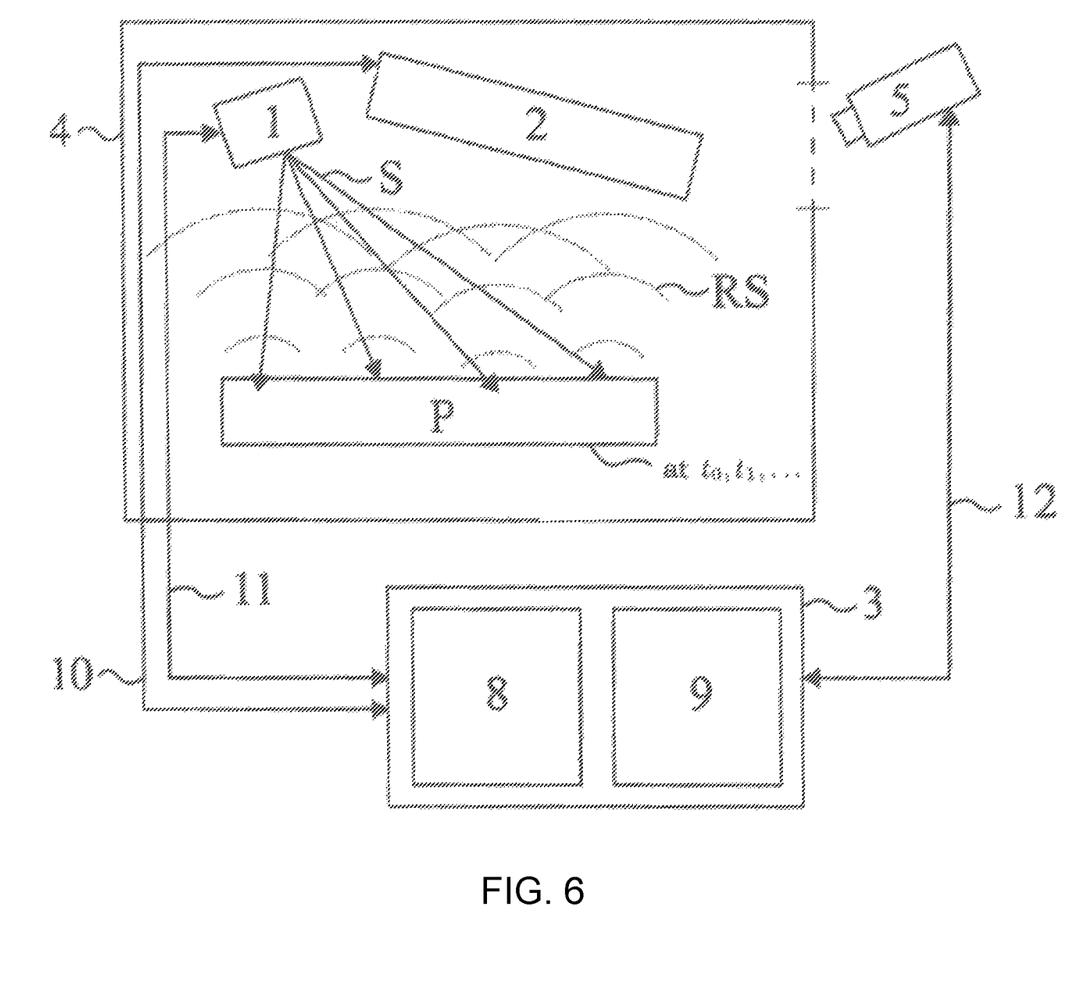
FIG. 6 shows a construction, given by way of example, for a third system according to the invention, this time in a reflection arrangement.

A further system of the invention which is configured basically like the system shown in FIG. 5 so that only the differences are described subsequently, is shown in FIG. 6 (identical reference numbers hence correspond to identical or corresponding features of FIG. 5).

In FIG. 6, the transmitter 1 and the receiver 2 are disposed on a side of the sample P in a reflection arrangement; the radiation received by the receiver and reflected on the sample P before receipt is designated with RS. The radiation reflected by the sample at different penetration depths is detected by the receiver 2. The remaining steps remain the same as in FIG. 5.

In a variant of FIG. 6 (not shown), transmitter and receiver can be configured in a single housing as transceiver. (The reflected radiation is then detected by this transceiver.)

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

The invention claimed is:

1. A system for detecting non-metallic, non-aqueous substances in an aqueous sample, the system comprising:
   a transmitter section configured to emit electromagnetic radiation in the terahertz range, wherein the electromagnetic radiation is configured to be directed onto the aqueous sample;
   a receiver section configured to detect radiation components of the electromagnetic radiation, wherein the radiation components are modified by the aqueous sample and/or the non-metallic, non-aqueous substances therein; and
   an evaluation section configured to evaluate the radiation components detected by the receiver section in order to establish whether the non-metallic, non-aqueous substances are present or not in the aqueous sample,
   the system configured such that a transition of the aqueous sample from a liquid aggregate state into a solid aggregate state or vice versa takes place,
   the receiver section configured to, for a plurality of different states of the aqueous sample, detect the radiation components, wherein the radiation components are modified respectively during the transition,
   the evaluation section configured to generate and evaluate difference images of the radiation components, wherein the radiation components are detected at different times,
   wherein the evaluation section is configured to evaluate the radiation components which are detected by the receiver section if the evaluation section establishes that (a) non-metallic, non-aqueous substance(s) is/are present in the aqueous sample, and
   wherein the radiation components are detected also with respect to one or more parameter(s) which characterise(s) the aqueous sample and/or the non-metallic, non-aqueous substance(s) situated therein.

2. The system according to claim 1,
wherein
the radiation components, which are modified respectively in the plurality of different transition states of the aqueous sample, are detected at a plurality of different, successive times,
wherein the radiation components, which are modified respectively during the transition of the aqueous sample from the liquid aggregate state into the solid aggregate state or vice versa, are detected by the receiver section.

3. The system according to claim 1,
wherein
the transition of the aqueous sample from the liquid aggregate state into the solid aggregate state or vice versa is effected by a converter section of the system.

4. The system according to claim 1,
wherein
the transmitter section and the receiver section are disposed such that the receiver section is configured to detect the modified radiation components in transmission of the electromagnetic radiation from the transmitter section.

5. The system according to claim 1,
wherein
the modified radiation components, which are detected respectively for the plurality of different states of the aqueous sample during transition of the aqueous sample from the liquid aggregate state into the solid aggregate state or vice versa, are evaluated by the evaluation section with respect to amplitude differences or intensity differences and/or differences in a sample permittivity.

6. The system according to claim 1, wherein
the system includes an imaging device for optical imaging of the aqueous sample.

7. The system according to claim 6, wherein the imaging device is configured to image the aqueous sample with electromagnetic radiation with wavelengths in the range visible for the human eye.

8. The system according to claim 1, wherein
the transmitter section and/or the receiver section comprises one or more silicon-germanium-based transmission-reception device(s).

9. The system according to claim 1, wherein the transition of the aqueous sample from the liquid aggregate state into the solid aggregate state or vice versa is effected by a converter section for changing the temperature of the aqueous sample.

10. The system according to claim 1, wherein the transition of the aqueous sample from the liquid aggregate state into the solid aggregate state or vice versa is effected by a freezing section for freezing the aqueous sample or a thawing section for thawing the aqueous sample.

11. The system according to claim 1, wherein the parameter(s) which characterise(s) the aqueous sample comprise:
the size(s) and/or shape(s) of the detected non-metallic, non-aqueous substance(s),
the respective position or distribution of the detected non-metallic, non-aqueous substance(s) in the aqueous sample and/or the respective weight, or
volume proportion of the detected non-metallic, non-aqueous substance(s) in the aqueous sample.

12. A unit for processing aqueous samples, the unit comprising:
a transport device for transport of samples; and
a system for detecting non-metallic, non-aqueous substances in an aqueous sample, the system comprising:
a transmitter section configured to emit electromagnetic radiation in the terahertz range, wherein the electromagnetic radiation is configured to be directed onto the sample,
a receiver section configured to detect radiation components of the electromagnetic radiation, wherein the radiation components are modified by the sample and/or the substances therein, and
an evaluation section configured to evaluate the radiation components detected by the receiver section in order to establish whether non-metallic, non-aqueous substances are present or not in the aqueous sample,
the system configured such that a transition of the aqueous sample from a liquid aggregate state into a solid aggregate state or vice versa takes place,
the receiver section configured to, for a plurality of different states of the aqueous sample, detect the radiation components which are modified respectively during this transition, and
the evaluation section configured to generate and evaluate difference images of the radiation components, wherein the radiation components are detected at different times,
wherein the transmitter section comprises a plurality of individual transmitters spatially positioned apart from each other, and the receiver section comprises a plurality of individual receivers spatially positioned apart from each other,
wherein each transmitter is assigned to precisely one of the receivers such that the one of the receivers is configured to detect the radiation components, which are modified by the sample(s), of the transmitter assigned thereto, wherein the receiver is configured to detect the radiation components at the moment of transport of a/the sample(s) through a region between the transmitter and the receiver via the transport device, and
wherein the evaluation section is configured to evaluate the modified beam components which are detected respectively by the plurality of receivers.

13. The unit of claim 12 used for the production, assembly and/or packaging of foods as such samples.

* * * * *